US010901478B2

(12) United States Patent
Nam et al.

(10) Patent No.: US 10,901,478 B2
(45) Date of Patent: Jan. 26, 2021

(54) PERFORMING A POWER SAVING OPERATION BASED ON A RECEIVED POWER SAVING SIGNAL AND POWER SAVING SIGNAL CONFIGURATION

(71) Applicant: QUALCOMM Incorporated, San Diego, CA (US)

(72) Inventors: Wooseok Nam, San Diego, CA (US); Tao Luo, San Diego, CA (US); Wanshi Chen, San Diego, CA (US); Peter Pui Lok Ang, San Diego, CA (US); Heechoon Lee, San Diego, CA (US); Juan Montojo, San Diego, CA (US); Olufunmilola Omolade Awoniyi-Oteri, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/673,630

(22) Filed: Nov. 4, 2019

(65) Prior Publication Data
US 2020/0150736 A1      May 14, 2020

Related U.S. Application Data

(60) Provisional application No. 62/760,815, filed on Nov. 13, 2018.

(51) Int. Cl.
*G06F 1/26* (2006.01)
*G06F 1/32* (2019.01)
(Continued)

(52) U.S. Cl.
CPC ............ *G06F 1/3209* (2013.01); *G06F 1/325* (2013.01); *G06F 1/1626* (2013.01)

(58) Field of Classification Search
CPC ....... G06F 1/325; G06F 1/1626; G06F 1/3209
See application file for complete search history.

(56) References Cited

U.S. PATENT DOCUMENTS 9,253,729 B1 *   2/2016  Sundar .............. H04W 52/0261
2016/0360558 A1 * 12/2016  Vangala ............ H04W 52/0209
(Continued)

OTHER PUBLICATIONS

Huawei, et al., "Power Saving Techniques," 3GPP Draft, 3GPP TSG RAN WG1 Meeting #95, R1-1812231, 3RD Generation Partnership Project (3GPP), Mobile Competence Centre, 650, Route Des Lucioles, F-06921, Sophia-Antipolis Cedex, France, vol. RAN WG1, No. Spokane, USA, 20181112-20181116, Nov. 11, 2018 (Nov. 11, 2018), XP051554103, 7 pages, Retrieved from the Internet: URL: http://www.3gpp.org/ftp/Meetings%5F3GPP%5FSYNC/RAN1/Docs/R1%2D1812231%2Ezip [retrieved on Nov. 11, 2018], the whole document,paragraphs [02.2], [02.3], [02.4], figure 2.
(Continued)

*Primary Examiner* — Nitin C Patel
(74) *Attorney, Agent, or Firm* — Harrity & Harrity, LLP

(57) ABSTRACT

Various aspects of the present disclosure generally relate to wireless communication. In some aspects, a user equipment (UE) may receive one or more power saving signals based at least in part on a selected power saving signal configuration of a set of power saving signal configurations, wherein the UE stores information identifying the set of power saving signal configurations; and perform a power saving operation based at least in part on the one or more power saving signals. In some aspects, a base station may determine one or more power saving signal configurations, of a set of power saving signal configurations, to be used to transmit one or more power saving signals; and transmit the one or more power saving signals using the one or more power saving signal configurations. Numerous other aspects are provided.

30 Claims, 7 Drawing Sheets

(51) Int. Cl.
  *G06F 1/3209*   (2019.01)
  *G06F 1/3234*   (2019.01)
  *G06F 1/16*   (2006.01)

(56) References Cited

U.S. PATENT DOCUMENTS

| | | | | |
|---|---|---|---|---|
| 2017/0332325 | A1* | 11/2017 | Nan | H04W 72/042 |
| 2019/0014542 | A1* | 1/2019 | Jain | H04W 52/028 |
| 2019/0132092 | A1* | 5/2019 | Chen | H04L 1/1896 |
| 2019/0297577 | A1* | 9/2019 | Lin | H04W 52/0219 |
| 2019/0327679 | A1* | 10/2019 | Gupta | H04W 52/0225 |

OTHER PUBLICATIONS

International Search Report and Written Opinion—PCT/US2019/059819—ISA/EPO—dated May 7, 2020.

\* cited by examiner

PERFORMING A POWER SAVING OPERATION BASED ON A RECEIVED POWER SAVING SIGNAL AND POWER SAVING SIGNAL CONFIGURATION

CROSS-REFERENCE TO RELATED APPLICATION

This application claims priority to U.S. Provisional Patent Application No. 62/760,815, filed on Nov. 13, 2018, entitled "POWER SAVING SIGNAL CONFIGURATION AND ADAPTATION," which is hereby expressly incorporated by reference herein.

FIELD OF THE DISCLOSURE

Aspects of the present disclosure generally relate to wireless communication, and more particularly to techniques and apparatuses for power saving signal configuration and adaptation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving one or more power saving signals based at least in part on a selected power saving signal configuration of a set of power saving signal configurations, wherein the UE stores information identifying the set of power saving signal configurations; and performing a power saving operation based at least in part on the one or more power saving signals.

In some aspects, a UE for wireless communication may include memory and one or more processors operatively coupled to the memory. The memory and the one or more processors may be configured to receive one or more power saving signals based at least in part on a selected power saving signal configuration of a set of power saving signal configurations, wherein the UE stores information identifying the set of power saving signal configurations; and perform a power saving operation based at least in part on the one or more power saving signals.

In some aspects, a non-transitory computer-readable medium may store one or more instructions for wireless communication. The one or more instructions, when executed by one or more processors of a UE, may cause the one or more processors to receive one or more power saving signals based at least in part on a selected power saving signal configuration of a set of power saving signal configurations, wherein the UE stores information identifying the set of power saving signal configurations; and perform a power saving operation based at least in part on the one or more power saving signals.

In some aspects, an apparatus for wireless communication may include means for receiving one or more power saving signals based at least in part on a selected power saving signal configuration of a set of power saving signal configurations, wherein the apparatus stores information identifying the set of power saving signal configurations; and means for performing a power saving operation based at least in part on the one or more power saving signals.

In some aspects, a method of wireless communication, performed by a base station, may include determining one or more power saving signal configurations, of a set of power saving signal configurations, to be used to transmit one or more power saving signals; and transmitting the one or more power saving signals using the one or more power saving signal configurations.

In some aspects, a base station for wireless communication may include memory and one or more processors operatively coupled to the memory. The memory and the one or more processors may be configured to determine one or more power saving signal configurations, of a set of power saving signal configurations, to be used to transmit one or more power saving signals; and transmit the one or more power saving signals using the one or more power saving signal configurations.

In some aspects, a non-transitory computer-readable medium may store one or more instructions for wireless communication. The one or more instructions, when executed by one or more processors of a base station, may cause the one or more processors to determine one or more power saving signal configurations, of a set of power saving signal configurations, to be used to transmit one or more power saving signals; and transmit the one or more power saving signals using the one or more power saving signal configurations.

In some aspects, an apparatus for wireless communication may include means for determining one or more power saving signal configurations, of a set of power saving signal configurations, to be used to transmit one or more power saving signals; and means for transmitting the one or more power saving signals using the one or more power saving signal configurations.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
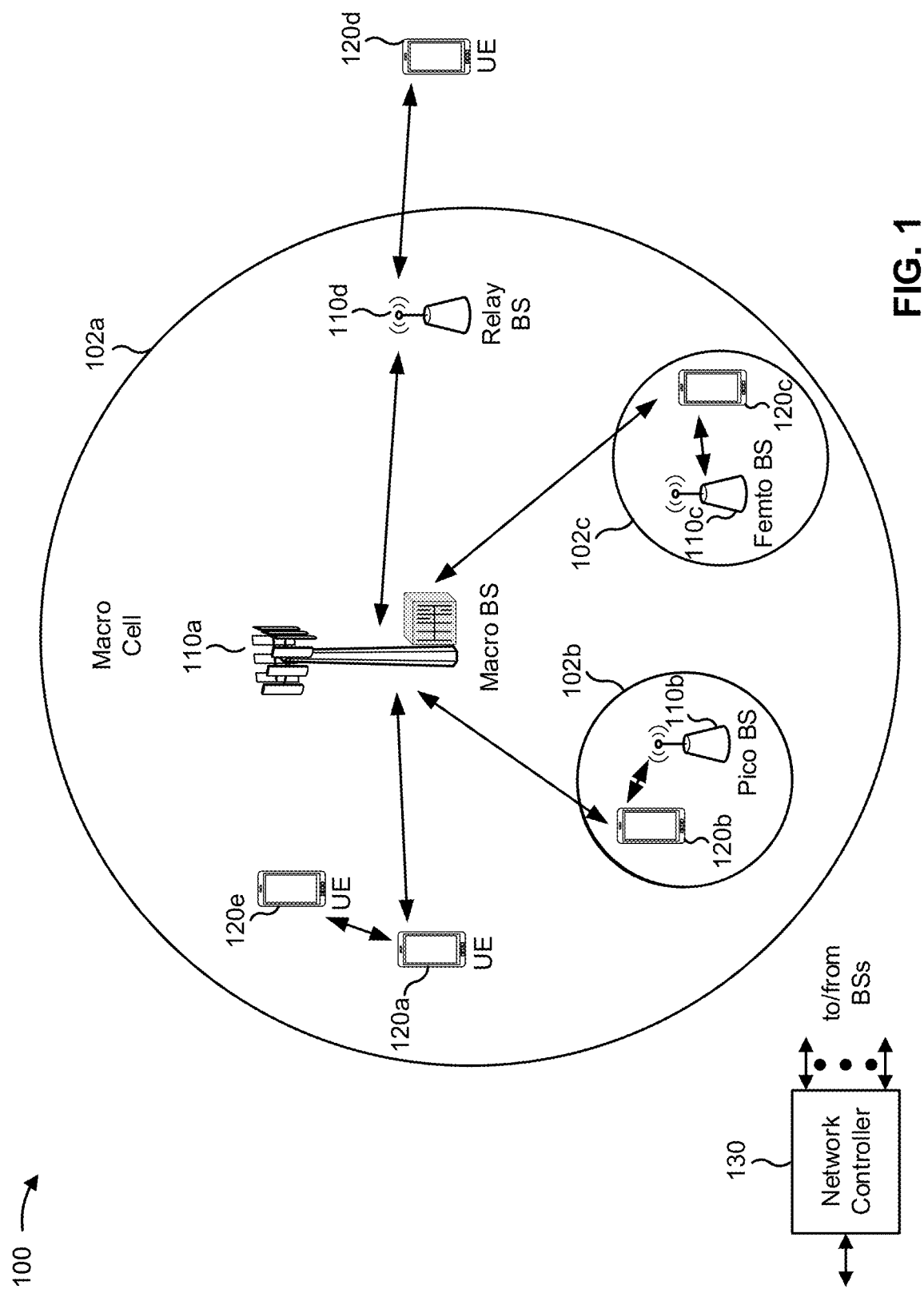
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
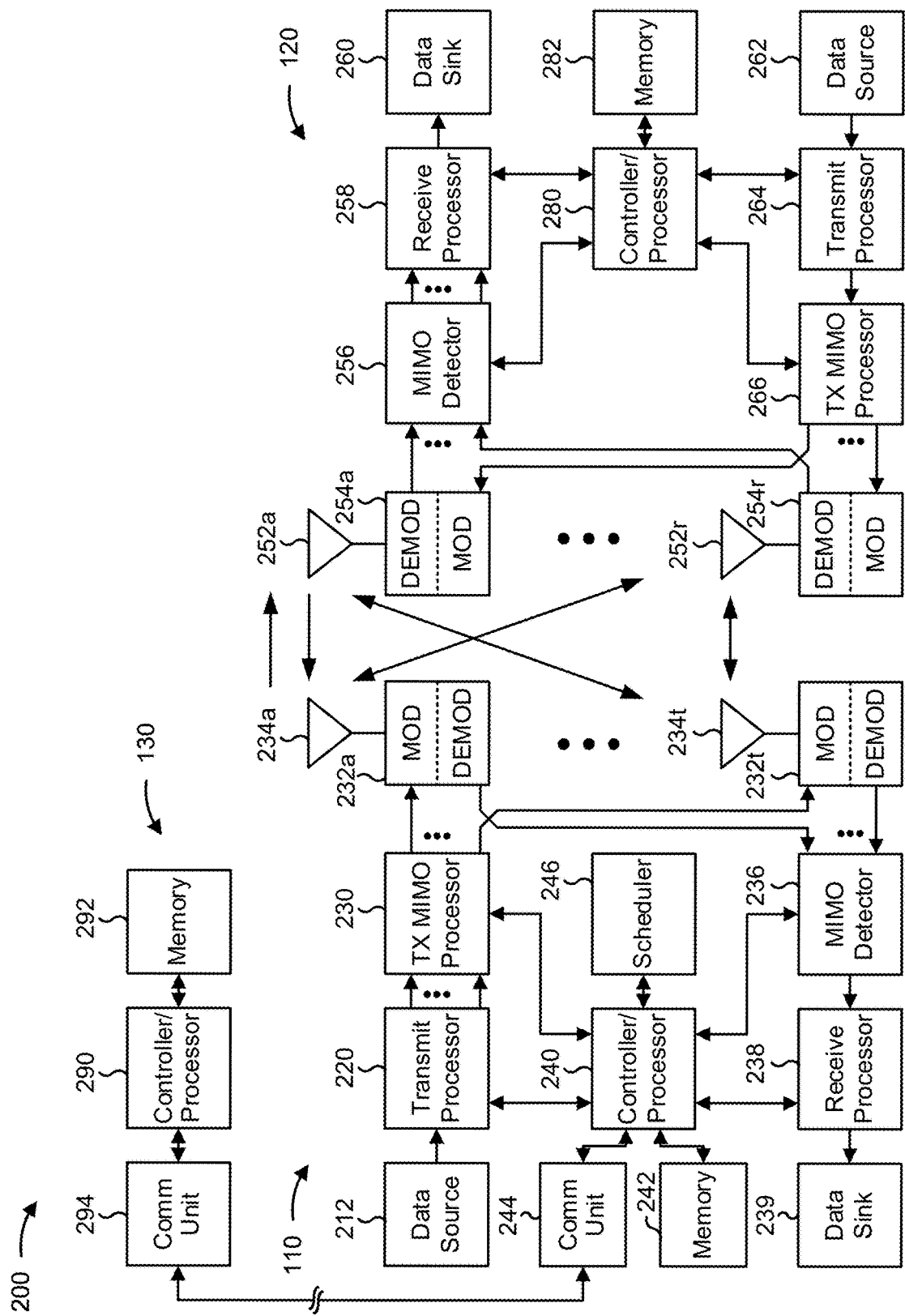
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with power saving signal configuration and adaptation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving one or more power saving signals based at least in part on a selected power saving signal configuration of a set of power saving signal configurations, wherein the UE 120 stores information identifying the set of power saving signal configurations; means for performing a power saving operation based at least in part on the one or more power saving signals; means for transmitting a request for the selected power saving signal configuration; means for determining the selected power saving signal configuration; means for receiving information indicating the selected power saving signal configuration; means for performing blind decoding based at least in part on the set of power saving signal configurations to identify the one or more power saving signals; means for determining a monitoring configuration for the one or more power saving signals based at least in part on a parameter or measurement of the UE 120; and/or the like. In some aspects, such means may include one or more components of UE 120 described in connection with FIG. 2.

In some aspects, base station 110 may include means for determining one or more power saving signal configurations, of a set of power saving signal configurations, to be used to transmit one or more power saving signals; means for transmitting the one or more power saving signals using the one or more power saving signal configurations; means for transmitting information identifying the one or more power saving signal configurations; means for transmitting the one or more power saving signals on multiple occasions or using multiple configurations; means for providing information indicating a parameter to be used to identify the one or more power saving signal configurations; and/or the like. In some aspects, such means may include one or more components of base station 110 described in connection with FIG. 2.

As indicated above, FIG. 2 is provided merely as an example. Other examples may differ from what is described with regard to FIG. 2.

A UE and/or a BS may use various power saving signals to improve power efficiency of the UE. For example, a wakeup signal (WUS) may be used for improved efficiency during a discontinuous reception (DRX) cycle, such as a connected-mode DRX (C-DRX) cycle. The UE may skip monitoring occasions or on-durations of the C-DRX cycle when a wakeup signal has not been received, and may wake up during a next monitoring occasion or on-duration after a wakeup signal is received. Thus, the UE may conserve battery power by activating only a low-complexity receiver, such as a wakeup signal subsystem, until a wakeup signal is received. Another type of power saving signal may cause the UE to skip one or more monitoring occasions (e.g., a particular number of monitoring occasions, all monitoring occasions until a WUS is received, and/or the like). This type of power saving signal may be termed a go-to-sleep signal (GTS). In some aspects, a power saving signal (e.g., a WUS, a GTS, or another type of signal) may carry information for a UE that relates to power consumption, such as a value of a parameter or a status relating to power consumption. For example, the parameters may indicate a group of active carriers (carrier aggregation), a bandwidth (e.g., a bandwidth part (BWP) configuration), a C-DRX configuration (e.g., an on-duration length, C-DRX cycle length, inactivity timer, and/or the like), a control channel configuration (e.g., a physical downlink control channel (PDCCH) monitoring periodicity, a control resource set (CORESET) bandwidth, and/or the like), and/or the like.

In some cases, different types of devices supporting different types of applications and/or services may coexist in a cell. Examples of different types of devices include UE handsets, Customer Premises Equipment (CPEs), vehicles, Internet of Things (IoT) devices, and/or the like. Examples of different types of applications include ultra-reliable low-latency communication (URLLC) applications, massive machine-type communication (mMTC) applications, enhanced mobile broadband (eMBB) applications, vehicle-to-anything (V2X) applications, and/or the like. Furthermore, in some cases, a single device may support different applications or services simultaneously. Power saving signals may need to satisfy different constraints for different device types, applications, and/or services. For example, a power saving signal may need to satisfy a reliability constraint (e.g., with regard to a false alarm and/or misdetection probability) or a coverage, latency, and/or detection complexity (e.g., relating to a UE capability). As a more particular example, URLLC may require a low misdetection probability and a low detection latency for a power saving signal, whereas mMTC may require a low detection energy for a power saving signal. Due to these different (and sometimes contradictory) constraints, a single type or a single configuration of the power saving signal may not satisfy all constraints for all UE types, applications, or services. Furthermore, designing the power saving signal based at least in part on a most stringent constraint of these constraints may require significant overhead and may not perform optimally in many situations.

Some techniques and apparatuses described herein may provide for a power saving signal configuration to be selected from a set of power saving signal configurations. For example, a power saving signal configuration may identify parameters or configuration values to be used to transmit or receive a power saving signal. A UE may be configured with a set of power saving signal configurations corresponding to power saving signals to be used in different situations (e.g., by different types of UEs, for different services, for different applications, and/or the like). The UE and/or the BS may determine a selected power saving signal configuration from the set of power saving signal configurations, and may transmit or receive a power saving signal in accordance with the selected power saving signal configuration. In this way, power saving signals may be provided in conformance with constraints of different UE types, applications, and/or services, thus improving network performance and UE power efficiency.

Figure 3:
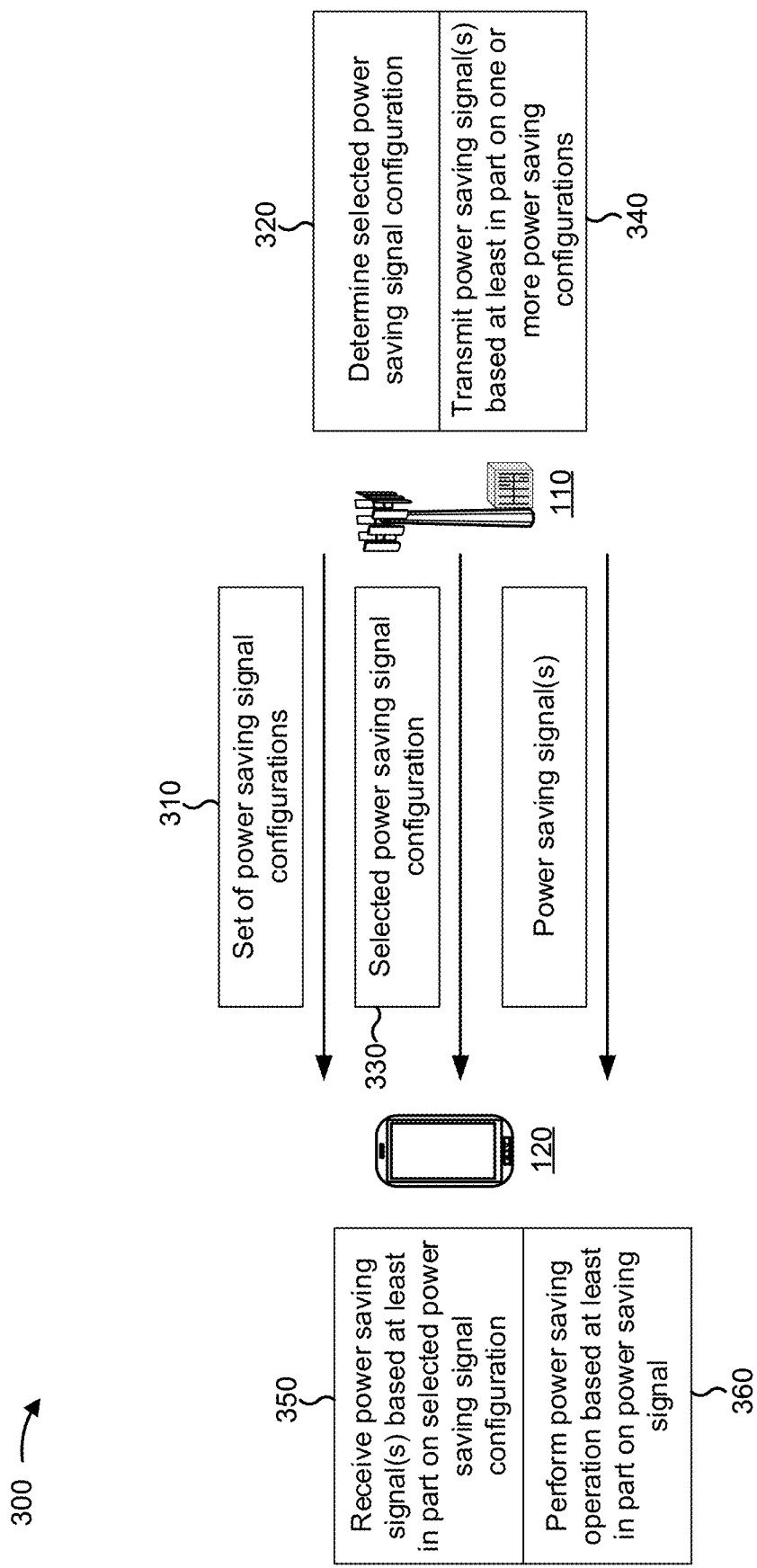
FIG. 3 is a diagram illustrating an example of base station-side determination of a selected power saving signal configuration for a power saving signal, in accordance with various aspects of the present disclosure.

FIG. 3 is a diagram illustrating an example 300 of base station-side determination of a selected power saving signal configuration for a power saving signal, in accordance with various aspects of the present disclosure.

As shown in FIG. 3, and by reference number 310, in some aspects, a BS 110 may provide information identifying a set of power saving signal configurations to a UE 120. The set of power saving signal configurations may identify power saving signal configurations to be selected for transmission or reception of a power saving signal based at least in part on one or more criteria. In some aspects, a power saving signal may correspond to a particular UE, a particular group of UEs, a particular UE type, a particular service, a particular group of services, a particular application, a particular group of applications, and/or the like. As just one example, the set of power saving signal configurations may identify a first power saving signal configuration to be used by a UE when the UE is to perform eMBB communication and a second power saving signal configuration to be used by the UE when the UE is to perform URLLC communication. In some aspects, the UE 120 may store the information identifying the set of power saving signal configurations. For example, the UE 120 may store the information identifying the set of power saving signal configurations based at least in part on receiving the information identifying the set of power saving signal configurations from the BS 110, or may store the information identifying the set of power saving signal configurations independently from the BS 110 (e.g., based at least in part on a wireless communication standard or specification, a manufacturer configuration, and/or the like).

In some aspects, a power saving signal configuration may identify a type of power saving signal (e.g., a control channel based power saving signal such as a physical downlink control channel (PDCCH)-based power saving signal, a reference signal based (RS-based) power saving signal, a sequence-based power saving signal, and/or the like). In some aspects, a power saving signal configuration may identify configuration information for a particular type of power saving signal. For example, when the power saving signal is a PDCCH-based power saving signal, the power saving signal configuration may identify a channel coding scheme (e.g., repetition-based, simplex, Reed-Muller, Polar, convolutional coding, and/or the like), whether a cyclic redundancy check (CRC) is to be used (e.g., to provide a lower false-alarm probability), a control channel element (CCE) aggregation level, a number of symbols of the power saving signal, and/or the like. As another example, when the power saving signal is an RS-based power saving signal or a sequence-based power saving signal, the power saving signal configuration may identify a bandwidth, a resource element (RE) density, a number of repetitions, a beam-sweeping configuration (e.g., a number of beams, a direction of beams, a quasi-collocation relationship for the power saving signal, and/or the like).

As shown by reference number 320, the BS 110 may determine a selected power saving signal configuration. In some aspects, the UE 120 may determine a selected power saving signal configuration, as described in more detail in connection with FIG. 4, below. In some aspects, the BS 110 may determine a selected power saving signal configuration for a particular time period (e.g., a slot, a subframe, a C-DRX cycle, and/or the like), a particular frequency (e.g., a bandwidth part, a carrier, a band), a particular spatial resource (e.g., a beam, a direction, and/or the like), and/or the like. In some aspects, the BS 110 may determine a selected power saving signal configuration for a group of UEs, for all UEs covered by the BS 110, and/or the like. In some aspects, the BS 110 may determine a selected power saving signal configuration for a single UE. For example, the BS 110 may determine respective power saving signal configurations for one or more UEs covered by the BS 110.

In some aspects, the BS 110 may determine the selected power saving signal configuration based at least in part on a channel condition. In some aspects, the BS 110 may determine the selected power saving signal configuration based at least in part on a UE mobility state. For example, the BS 110 may determine that a cell-edge UE 120 or a high-mobility UE 120 is to use an RS-based power saving signal for improved coverage or that a cell-center UE or a low-mobility UE 120 is to use a PDCCH-based power saving signal for improved power management information provision. In some aspects, the BS 110 may determine the selected power saving signal configuration based at least in part on a measurement report from the UE 120. For example, the UE 120 may provide the measurement report to the BS 110 (not shown in FIG. 3). In some aspects, the BS 110 may determine a power saving signal configuration based at least in part on a request for the power saving signal configuration. For example, the UE 120 may determine a desired power saving signal configuration (e.g., based at least in part on the criteria described above or other criteria), and may provide a request to the BS 110 indicating the desired power saving signal configuration (not shown in FIG. 3). This may conserve processor resources of the BS 110 that would otherwise be used to determine the selected power saving signal configuration at the BS 110.

As shown by reference number 330, the BS 110 may provide information indicating the selected power saving signal configuration to the UE 120. In some aspects, the BS 110 may provide this information as downlink control information, radio resource control information, a media access control (MAC) control element (CE) and/or the like. In this way, the BS 110 may indicate, to the UE 120, the selected power saving signal configuration, thereby conserving processor resources of the UE 120 that would otherwise be used to determine the selected power saving signal configuration at the UE 120. In some aspects, the BS 110 may provide information identifying respective power saving signal configurations to multiple UEs 120. In some aspects, the BS 110 may not signal the selected power saving signal configuration to the UE 120, thereby conserving signaling resources of the BS 110. In this case, the UE 120 may determine the selected power saving signal configuration independently of the BS 110 (e.g., based at least in part on the set of power saving signal configurations), or may perform blind decoding using hypotheses based at least in part on the set of power saving signal configurations, as described in more detail below.

As shown by reference number 340, the BS 110 may transmit one or more power saving signals (shown as "power saving signal(s)") based at least in part on one or more power saving signal configurations. For example, in the case when the BS 110 signals the selected power saving signal configuration, the BS 110 may transmit the one or more power saving signals based at least in part on the selected power saving signal configuration. In some aspects, the BS 110 may transmit the one or more power saving signals according to multiple, different selected power saving signal configurations (e.g., when the one or more power saving signals include multiple power saving signals to be received by UEs 120 associated with different selected power saving signal configurations).

As an illustrative example, assume that a first UE 120 is at a cell edge and a second UE 120 is at a cell center of a cell provided by the BS 110. In that case, the BS 110 may select a first power saving signal configuration, of a set of power saving signal configurations, for the first UE 120, and may select a second power saving signal configuration, of the set of power saving signal configurations, for the second UE 120. The first power saving signal configuration may indicate that a reference signal (RS)-based power saving signal is to be transmitted for the first UE 120, and may indicate a bandwidth, a number of repetitions, and/or the like, for the RS-based power saving signal. The second power saving signal configuration may indicate that a PDCCH-based power saving signal is to be transmitted for the second UE 120, and may indicate a channel coding scheme, a presence of a CRC, and/or the like for the PDCCH-based power saving signal. The BS 110 may generate and transmit the RS-based power saving signal in accordance with the first power saving signal configuration and the PDCCH-based power saving signal in accordance with the second power saving signal configuration. Thus, the BS 110 efficiently provides wakeup signals for the first UE 120 and the second UE 120, despite the differing channel conditions and requirements of the first UE 120 and the second UE 120. Thus, network efficiency and power management of the BS 110, the first UE 120, and the second UE 120 are improved.

In some aspects, a power saving signal may include a wakeup signal. In some aspects, a power saving signal may include a go-to-sleep signal. In some aspects, a power saving signal may include information for performing power management (e.g., information for a UE 120 to trigger a parameter change or a status change related to power consumption). For example, the parameter change may relate to a group of active carriers (e.g., for carrier aggregation), a bandwidth (e.g., a BWP config), a C-DRX configuration (e.g., an on-duration length, a C-DRX cycle length, an inactivity timer, and/or the like), a control channel configuration (e.g., a PDCCH monitoring periodicity, a CORESET bandwidth, and/or the like), and/or the like. In some aspects, an RS-based wakeup signal may be based at least in part on a channel state information reference signal, a tracking reference signal, a demodulation reference signal, or a different type of reference signal. In some aspects, a sequence-based wakeup signal may be based at least in part on a preamble, a physical control format indicator channel (PCFICH), and/or the like. In some aspects, a PDCCH-based wakeup signal may be based at least in part on a downlink control information format.

As shown by reference number 350, the UE 120 may receive the one or more power saving signals based at least in part on the selected power saving signal configuration. For example, the UE 120 may monitor a particular bandwidth or sub-band, may monitor particular time, spatial, or frequency resources, may search particular search spaces, may perform decoding based at least in part on an indicated channel coding scheme, may perform a CRC in a particular fashion, may decode a particular number of repetitions, and/or the like, based at least in part on the selected power saving signal configuration.

In some aspects, the UE 120 may perform blind decoding based at least in part on multiple, different hypotheses. For example, the BS 110 may determine the selected power saving signal configuration, and may not indicate the selected power saving signal configuration to the UE 120. In such a case, the UE 120 may search based at least in part on hypotheses until a power saving signal is detected. The hypotheses may be based at least in part on the set of power saving signal configurations, a subset of the set of power saving signal configurations, and/or the like. In some aspects, the BS 110 may provide information indicating selected power saving signal configurations for all power saving signals to be transmitted by the BS 110. UEs 120 covered by the BS 110 may perform blind searches based at least in part on the selected power saving signal configurations until each UE 120 identifies a power saving signal relevant to that UE 120 (e.g., based at least in part on encoding the power saving signal using a value specific to that UE 120). This may reduce overhead relative to signaling each selected power saving signal configuration to the corresponding UE 120.

As shown by reference number 360, the UE 120 may perform a power saving operation based at least in part on the power saving signal. For example, when the power saving signal is a wakeup signal, the UE 120 may wake up in a next on-duration. As another example, when the power saving signal is a go-to-sleep signal, the UE 120 may skip one or more on-durations based at least in part on the go-to-sleep signal. As yet another example, the UE 120 may adjust a parameter relating to power management, such as a transmit power, a bandwidth, a number of active component carriers, a C-DRX cycle configuration, and/or the like. In some aspects, when the power saving signal pertains to a particular application or group of applications, the UE 120 may perform the power saving operation for the particular application or group of applications. In some aspects, when the power saving signal pertains to a particular service or group of services, the UE 120 may perform the power saving operation for the particular service or group of services.

In this way, power saving signals may be configured to meet the constraints or requirements of different UEs and to take into account different channel conditions for different UEs. For example, each power saving signal configuration, of the set of power saving signal configurations, can be configured on a per application, a per service, and/or a per UE basis. As used herein, configuring a power saving signal configuration on a per application basis may refer to a first power saving signal configuration being configured for a first application, a second power saving signal being configured for a second application, and so on. Per UE and per service bases are defined similarly. Thus, the reliability of power saving signals may be improved and UE power management may be more reliably administered, thereby improving UE power efficiency.

As indicated above, FIG. 3 is provided as an example. Other examples may differ from what is described with respect to FIG. 3.

Figure 4:
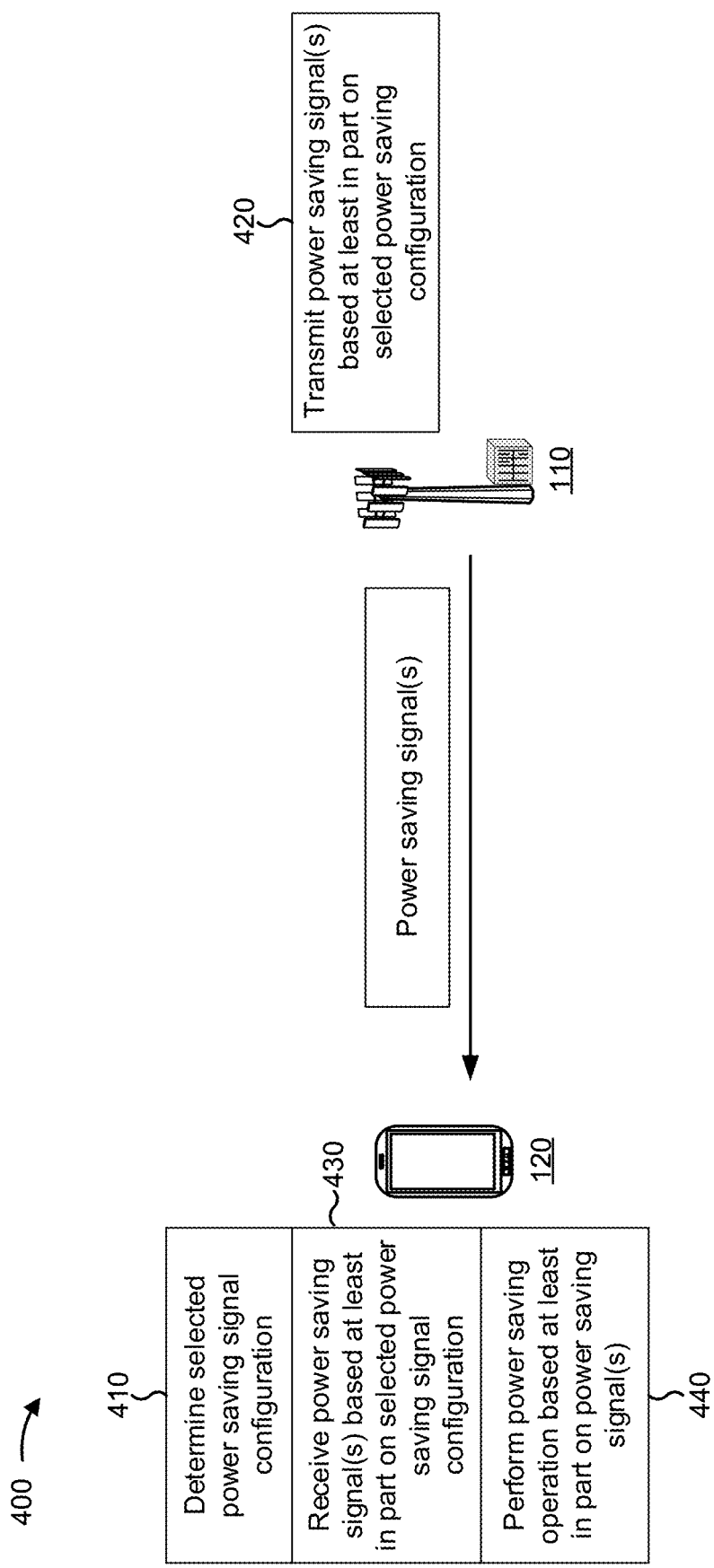
FIG. 4 is a diagram illustrating an example of UE-side determination of a selected power saving signal configuration for a power saving signal, in accordance with various aspects of the present disclosure.

FIG. 4 is a diagram illustrating an example 400 of UE-side determination of a selected power saving signal configuration for a power saving signal, in accordance with various aspects of the present disclosure.

As shown in FIG. 4, and by reference number 410, in some aspects, a UE 120 may determine a selected power saving signal configuration. For example, the UE 120 may determine the selected power saving signal configuration based at least in part on a channel condition at the UE 120, a mobility state of the UE 120, a measurement performed by the UE 120, an application associated with the UE 120, a service used for communication by the UE 120, a previous power saving signal (e.g., a failure to receive a previous power saving signal, a successful reception of a previous power saving signal, and/or the like), and/or the like.

As shown by reference number 420, the BS 110 may transmit one or more power saving signals based at least in part on the selected power saving signal configuration. For example, in some cases, the UE 120 may signal a request for the selected power saving signal configuration to the BS 110. In this case, the BS 110 may transmit a power saving signal based at least in part on the selected power saving signal configuration, thereby conserving processor resources of the BS 110 that would otherwise be used to determine the selected power saving signal configuration and signaling resources of the BS 110 that would otherwise be used to transmit multiple, different power saving signals for the UE 120. In some aspects, the BS 110 may transmit multiple, different power saving signals based at least in part on the set of power saving signal configurations that is known to the UE 120 and the BS 110. In this case, the UE 120 may receive a power saving signal, of the multiple, different power saving signals, based at least in part on the selected power saving signal configuration. Thus, signaling resources of the UE 120 that would otherwise be used to indicate the selected power saving signal configuration to the BS 110 are conserved.

As shown by reference number 430, the UE 120 may receive the one or more power saving signals based at least in part on the selected power saving signal configuration. This is described in more detail above in connection with FIG. 3. As shown by reference number 440, the UE 120 may perform a power saving operation based at least in part on the one or more power saving signals. This is also described in more detail above in connection with FIG. 3.

In this way, the UE 120 may determine the selected power saving signal configuration, and may receive the power saving signal based at least in part on the selected power saving signal configuration. Thus, resources of the BS 110 that would otherwise be used to determine the selected power saving signal configuration for the UE 120 are conserved.

As indicated above, FIG. 4 is provided as an example. Other examples may differ from what is described with respect to FIG. 4.

Figure 5:
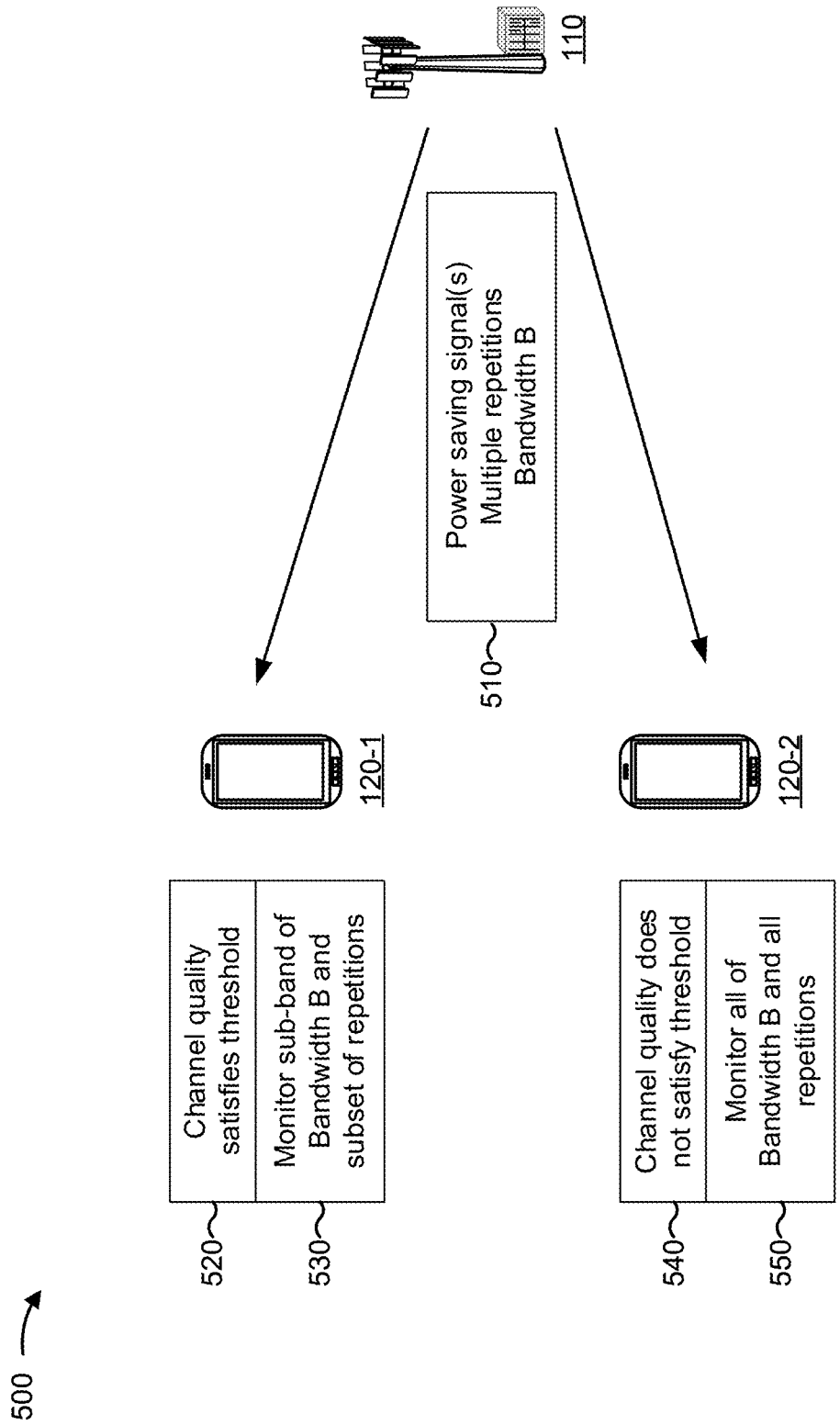
FIG. 5 is a diagram illustrating an example of UE-side scaling of a power saving signal configuration based at least in part on channel conditions, in accordance with various aspects of the present disclosure.

FIG. 5 is a diagram illustrating an example 500 of UE-side scaling of a power saving signal configuration based at least in part on channel conditions, in accordance with various aspects of the present disclosure. As shown, FIG. 5 includes a UE 120-1 and a UE 120-2. In some aspects, the UE 120-1 and the UE 120-2 may be associated with a UE group or may be part of a same UE group. In some aspects, the UE 120-1 and the UE 120-2 may not be associated with a UE group (e.g., may not be part of the same UE group).

As shown by reference number 510, the BS 110 may transmit one or more power saving signals for the UEs 120-1 and 120-2. As further shown, the BS 110 may perform multiple repetitions of the one or more power saving signals, and may transmit the one or more power saving signals with a bandwidth B. In this case, the UEs 120-1 and 120-2 may use a common power saving signal (e.g., a power saving signal using group-specific signaling, when the UEs 120-1 and 120-2 are associated with a same UE group). Thus, the BS 110 may configure the power saving signal to meet a most stringent requirement of the UEs 120-1 and 120-2. For example, the BS 110 may configure the power saving signal to meet a most stringent reliability requirement, a most stringent latency requirement, a most stringent transmission energy requirement, and/or the like.

As shown by reference number 520, the UE 120-1 may determine that a channel quality of the UE 120-1 satisfies a threshold. For example, the UE 120-1 may determine that the channel quality satisfies a quality threshold, indicating that the channel quality is good. Accordingly, and as shown by reference number 530, the UE 120-1 may monitor a sub-band of Bandwidth B and/or a subset (e.g., a proper subset) of repetitions of the one or more power saving signals. Thus, the UE 120-1 may conserve monitoring resources that would otherwise be used to monitor the entirety of Bandwidth B and/or all repetitions of the power saving signal.

As shown by reference number 540, the UE 120-2 may determine that a channel quality of the UE 120-2 fails to satisfy a threshold. For example, the UE 120-2 may determine that the channel quality does not satisfy the quality threshold, indicating that the channel quality is bad. Accordingly, and as shown by reference number 550, the UE 120-2 may monitor all of Bandwidth B (e.g., an entirety of the bandwidth of the one or more power saving signals) and/or all repetitions of the one or more power saving signals. Thus, the UE 120-2 may improve likelihood of reception of the power saving signal.

In this way, the UE 120-1 and the UE 120-2 may perform UE-side scaling of the power saving signal. For example, each UE of the UE group may determine a respective monitoring configuration based at least in part on conditions at that UE, thereby reducing the number of different power saving signal configurations to be used the BS, which conserves resources of the BS.

The operations described in connection with FIG. 5 are primarily described with reference to channel quality. However, the operations described in connection with FIG. 5 can be performed using other factors. As one example, the factor may relate to a reliability requirement (e.g., a UE or application that requires a higher reliability level may monitor more repetitions or a wider bandwidth than a UE or application that does not require a higher reliability). As another example, the factor may relate to a UE capability. For example, if a UE has a larger number of antennas, the UE may monitor fewer repetitions than a UE with a smaller number of antennas due to the receive diversity of the UE with the larger number of antennas.

As indicated above, FIG. 5 is provided as an example. Other examples may differ from what is described with respect to FIG. 5.

Figure 6:
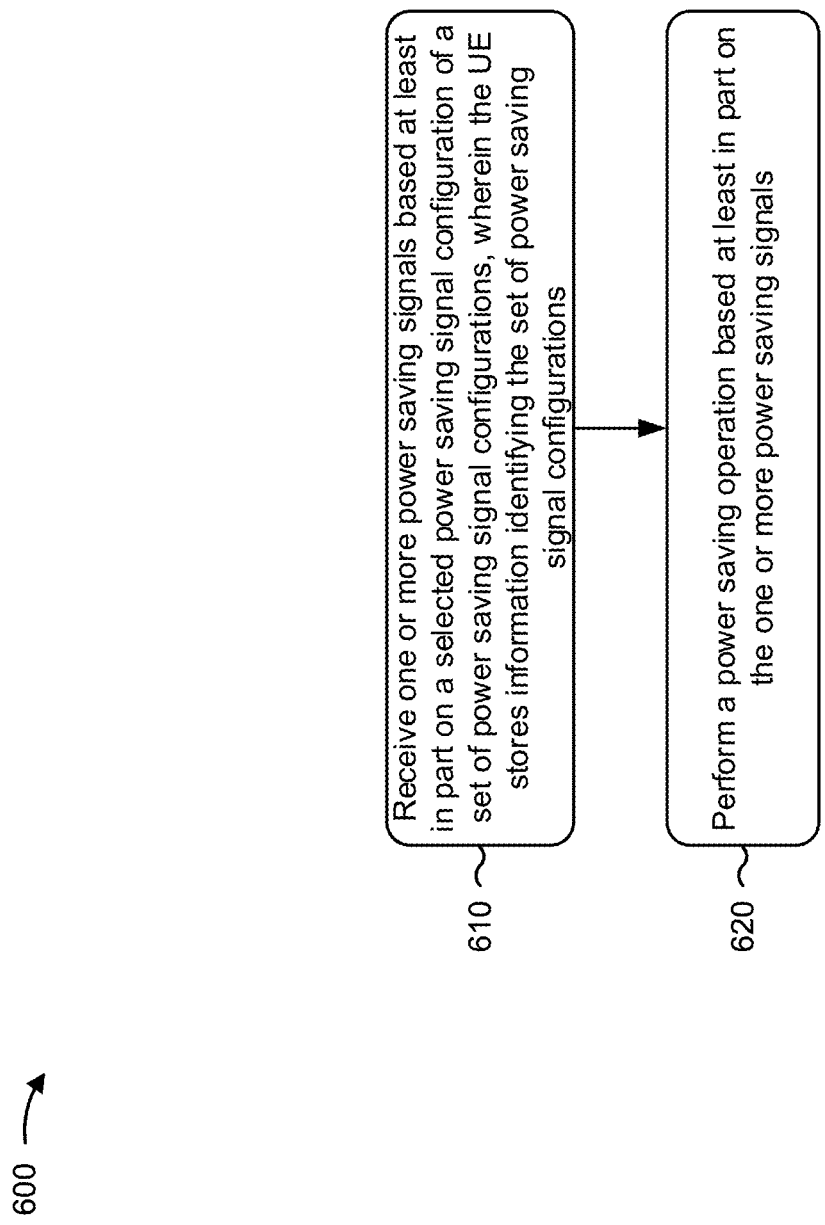
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs power saving signal configuration and adaptation.

As shown in FIG. 6, in some aspects, process 600 may include receiving one or more power saving signals based at least in part on a selected power saving signal configuration of a set of power saving signal configurations, wherein the UE stores information identifying the set of power saving signal configurations (block 610). For example, the UE (e.g., using antenna 252, DEMOD 254, MIMO detector 256, receive processor 258, controller/processor 280, and/or the like) may receive one or more power saving signals based at least in part on a selected power saving signal configuration. The selected power saving signal configuration may be selected (by the UE or a base station) from a set of power saving signal configurations. The UE may store information identifying the set of power saving signal configurations.

As shown in FIG. 6, in some aspects, process 600 may include performing a power saving operation based at least in part on the one or more power saving signals (block 620). For example, the UE (e.g., using antenna 252, DEMOD 254, MIMO detector 256, receive processor 258, controller/processor 280, and/or the like) may perform a power saving operation based at least in part on the one or more power saving signals.

Process 600 may include additional aspects, such as any single aspect and/or any combination of aspects described below and/or in connection with one or more other processes described elsewhere herein.

In a first aspect, each power saving signal configuration, of the set of power saving signal configurations, is configured on a per application, a per service, or a per UE basis. In a second aspect, alone or in combination with the first aspect, the UE may transmit a request for the selected power saving signal configuration. In a third aspect, alone or in combination with any one or more of the first and second aspects, the UE may determine the selected power saving signal configuration. In a fourth aspect, alone or in combination with any one or more of the first through third aspects, the selected power saving signal configuration is determined based at least in part on a parameter configured by a base station.

In a fifth aspect, alone or in combination with any one or more of the first through fourth aspects, the UE may receive information indicating the selected power saving signal configuration. In a sixth aspect, alone or in combination with any one or more of the first through fifth aspects, the selected power saving signal configuration is to be used for one or more of a particular time resource, a particular frequency resource, or a particular beam. In a seventh aspect, alone or in combination with any one or more of the first through sixth aspects, receiving the one or more power saving signals further comprises performing blind decoding based at least in part on the set of power saving signal configurations to identify the one or more power saving signals. In an eighth aspect, alone or in combination with any one or more of the first through seventh aspects, the UE may determine a monitoring configuration for the one or more power saving signals based at least in part on a parameter or measurement of the UE.

In a ninth aspect, alone or in combination with any one or more of the first through eighth aspects, the one or more power saving signals are associated with a group of UEs including the UE. In a tenth aspect, alone or in combination with any one or more of the first through ninth aspects, the selected power saving signal configuration indicates a power saving signal type of the one or more power saving signals. In an eleventh aspect, alone or in combination with any one or more of the first through tenth aspects, the selected power saving signal configuration indicates, for the one or more power saving signals, at least one of a channel coding scheme, whether a cyclic redundancy check is to be used, a control channel element aggregation level, a number of symbols, a bandwidth, a resource element density, a number of repetitions, or a beam-sweeping configuration. In a twelfth aspect, alone or in combination with any one or more of the first through eleventh aspects, the one or more power saving signals include at least one of: a wakeup signal, a go-to-sleep signal, or information indicating a parameter or status change relating to power consumption.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
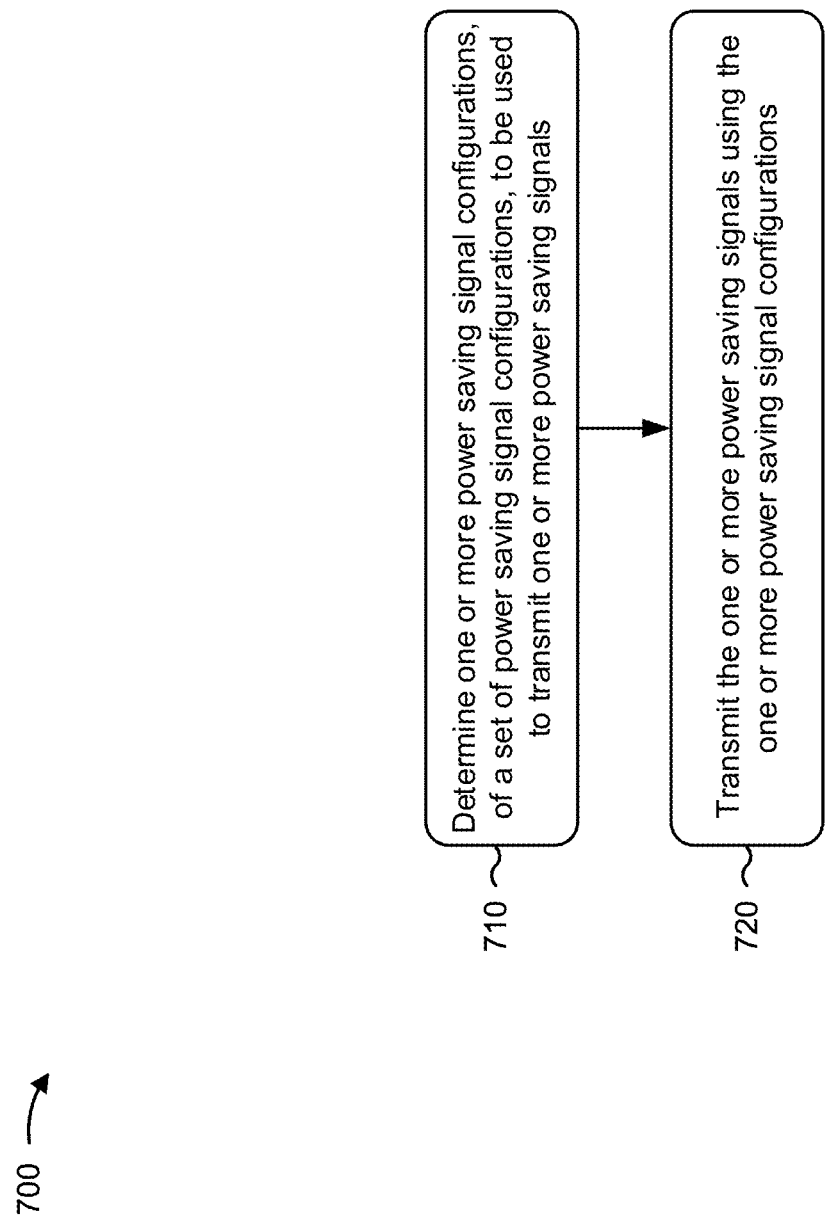
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where a base station (e.g., BS 110) performs power saving signal configuration and adaptation.

As shown in FIG. 7, in some aspects, process 700 may include determining one or more power saving signal configurations, of a set of power saving signal configurations, to be used to transmit one or more power saving signals (block 710). For example, the base station (e.g., using controller/processor 240 and/or the like) may determine one or more power saving signal configurations. The one or more power saving signal configurations may be of a set of power saving signal configurations. The one or more power saving signal configurations may be used to transmit one or more power saving signals.

As shown in FIG. 7, in some aspects, process 700 may include transmitting the one or more power saving signals using the one or more power saving signal configurations (block 720). For example, the base station (e.g., using controller/processor 240, transmit processor 220, TX MIMO processor 230, MOD 232, antenna 234, and/or the like) may transmit the one or more power saving signals using the one or more power saving signal configurations.

Process 700 may include additional aspects, such as any single aspect and/or any combination of aspects described below and/or in connection with one or more other processes described elsewhere herein.

In a first aspect, determining the one or more power saving signal configurations is based on at least one of a channel condition of a UE to receive the one or more power saving signals, a mobility state of the UE, or a measurement report transmitted by the UE. In a second aspect, alone or in combination with the first aspect, the base station may transmit information identifying the one or more power saving signal configurations. In a third aspect, alone or in combination with one or more of the first aspect and the second aspect, transmitting the one or more power saving signals further comprises transmitting the one or more power saving signals on multiple occasions or using multiple configurations.

In a fourth aspect, alone or in combination with any one or more of the first through third aspects, the one or more power saving signals are for a group of user equipment (UEs). In some aspects, determining the one or more power saving signal configurations is based at least in part on respective requirements of UEs of the group of UEs. In a fifth aspect, alone or in combination with any one or more of the first through fourth aspects, each power saving signal configuration, of the set of power saving signal configurations, is configured on a per application, a per service, or a per user equipment basis.

In a sixth aspect, alone or in combination with any one or more of the first through fifth aspects, determining the one or more power saving signal configurations is based at least in part on one or more requests for the one or more power saving signal configurations. In a seventh aspect, alone or in combination with any one or more of the first through sixth aspects, the base station may provide information indicating a parameter to be used to identify the one or more power saving signal configurations. In an eighth aspect, alone or in combination with any one or more of the first through seventh aspects, the one or more power saving signal configurations are to be used for one or more of a particular time resource, a particular frequency resource, or a particular beam. In a ninth aspect, alone or in combination with any one or more of the first through eighth aspects, the one or more power saving signals are associated with a group of user equipments, a group of applications, and/or a group of services.

In a tenth aspect, alone or in combination with any one or more of the first through ninth aspects, the one or more power saving signal configurations indicate a power saving signal type of the one or more power saving signals. In an eleventh aspect, alone or in combination with any one or more of the first through tenth aspects, the one or more power saving signal configurations indicate, for the one or more power saving signals, at least one of a channel coding scheme, whether a cyclic redundancy check is to be used, a control channel element aggregation level, a number of symbols, a bandwidth, a resource element density, a number of repetitions, or a beam-sweeping configuration.

In a twelfth aspect, alone or in combination with any one or more of the first through eleventh aspects, the one or more power saving signals include at least one of: a wakeup signal, a go-to-sleep signal, or information indicating a parameter or status change relating to power consumption.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving one or more power saving signals based at least in part on a power saving signal configuration
      wherein the UE stores information identifying the power saving signal configuration, and
      wherein receiving the one or more power saving signals further comprises:
         performing blind decoding based at least in part on the power saving signal configuration to identify the one or more power saving signals; and
   performing a power saving operation based at least in part on the one or more power saving signals.

2. The method of claim 1, wherein the power saving signal configuration is configured on a per application, a per service, or a per UE basis.

3. The method of claim 1, further comprising:
   transmitting a request for the power saving signal configuration.

4. The method of claim 1, wherein the UE stores information identifying a set of power saving signal configurations including the power saving signal configuration,
   wherein the method further comprises:
      determining the power saving signal configuration from among the set of Power saving signal configurations.

5. The method of claim 1, wherein the power saving signal configuration is determined based at least in part on a parameter configured by a base station.

6. The method of claim 1, further comprising:
   receiving information indicating the power saving signal configuration.

7. The method of claim 1, wherein the power saving signal configuration is used for one or more of a particular time resource, a particular frequency resource, or a particular beam.

8. The method of claim 1, further comprising:
   determining a monitoring configuration for the one or more power saving signals based at least in part on a parameter or measurement of the UE.

9. The method of claim 1, wherein the one or more power saving signals are associated with a group of UEs including the UE.

10. The method of claim 1, wherein the power saving signal configuration indicates a power saving signal type of the one or more power saving signals.

11. The method of claim 1, wherein the power saving signal configuration indicates, for the one or more power saving signals, at least one of:
   a channel coding scheme,
   whether a cyclic redundancy check is used,
   a control channel element aggregation level,
   a number of symbols,
   a bandwidth,
   a resource element density,
   a number of repetitions, or
   a beam-sweeping configuration.

12. The method of claim 1, wherein the one or more power saving signals include at least one of:
   a wakeup signal,
   a go-to-sleep signal, or
   information indicating a parameter or status change relating to power consumption.

13. A method of wireless communication performed by a base station, comprising:
   determining one or more power saving signal configurations to be used to transmit one or more power saving signals; and
   transmitting the one or more power saving signals using the one or more power saving signal configurations,
      wherein the one or more power saving signals are to be identified using blind decoding based at least in part on the one or more power saving signal configurations.

14. The method of claim 13, wherein determining the one or more power saving signal configurations is based on at least one of:
   a channel condition of a user equipment (UE) to receive the one or more power saving signals,
   a mobility state of the UE, or
   a measurement report transmitted by the UE.

15. The method of claim 13, further comprising:
   transmitting information identifying the one or more power saving signal configurations.

16. The method of claim 13, wherein transmitting the one or more power saving signals further comprises:
   transmitting the one or more power saving signals on multiple occasions or using multiple configurations.

17. The method of claim 13, wherein the one or more power saving signals are for a group of UEs.

18. The method of claim 17, wherein determining the one or more power saving signal configurations is based at least in part on respective requirements of UEs of the group of UEs.

19. The method of claim 13, wherein the one or more power saving signal configurations are configured on a per application, a per service, or a per user equipment basis.

20. The method of claim 13, wherein determining the one or more power saving signal configurations is based at least in part on one or more requests for the one or more power saving signal configurations.

21. The method of claim 13, further comprising:
   providing information indicating a parameter to be used to identify the one or more power saving signal configurations.

22. The method of claim 13, wherein the one or more power saving signal configurations are to be used for one or more of a particular time resource, a particular frequency resource, or a particular beam.

23. The method of claim 13, wherein the one or more power saving signals are associated with at least one of a group of user equipment, a group of applications, or group of services.

24. The method of claim 13, wherein the one or more power saving signal configurations indicate a power saving signal type of the one or more power saving signals.

25. The method of claim 13, wherein the one or more power saving signal configurations indicate, for the one or more power saving signals, at least one of:
   a channel coding scheme,
   whether a cyclic redundancy check is to be used,
   a control channel element aggregation level,
   a number of symbols,
   a bandwidth,
   a resource element density,
   a number of repetitions, or
   a beam-sweeping configuration.

26. The method of claim 13, wherein the one or more power saving signals include at least one of:
   a wakeup signal,
   a go-to-sleep signal, or
   information indicating a parameter or status change relating to power consumption.

27. A user equipment (UE) for wireless communication, comprising:
   a memory; and
   one or more processors operatively coupled to the memory, the memory and the one or more processors configured to:
      receive one or more power saving signals based at least in part on a power saving signal configuration,
         wherein the UE stores information identifying the power saving signal configuration, and
         wherein the one or more power saving signals is received by performing blind decoding based at least in part on the power saving signal configuration to identify the one or more power saving signals; and
      perform a power saving operation based at least in part on the one or more power saving signals.

28. The UE of claim 27, wherein the power saving signal configuration is configured on a per application, a per service, or a per UE basis.

29. The UE of claim 27, wherein the power saving signal configuration is used for one or more of a particular time resource, a particular frequency resource, or a particular beam.

30. A base station for wireless communication, comprising:
   a memory; and
   one or more processors operatively coupled to the memory, the memory and the one or more processors configured to:
      determine one or more power saving signal configurations to be used to transmit one or more power saving signals; and
      transmit the one or more power saving signals using the one or more power saving signal configurations,
         wherein the one or more power saving signals are to be identified using blind decoding based at least in part on the one or more power saving signal configurations.

* * * * *